(12) United States Patent
Funke (10) Patent No.: US 11,584,504 B2
(45) Date of Patent: Feb. 21, 2023

(54) QUICK ATTACH BRACKET

(71) Applicant: Textron Innovations, Inc., Providence, RI (US)

(72) Inventor: Edward Francis Funke, Cheney, KS (US)

(73) Assignee: Textron Innovations, Inc., Providence, RI (US)

(*) Notice: Subject to any disclaimer, the term of this patent is extended or adjusted under 35 U.S.C. 154(b) by 14 days.

(21) Appl. No.: 17/119,137

(22) Filed: Dec. 11, 2020

(65) Prior Publication Data

US 2021/0179251 A1 Jun. 17, 2021

Related U.S. Application Data

(60) Provisional application No. 62/947,420, filed on Dec. 12, 2019.

(51) Int. Cl.
| | |
|---|---|
| *B64C 1/40* | (2006.01) |
| *B64C 1/12* | (2006.01) |
| *B64D 41/00* | (2006.01) |
| *H01B 17/26* | (2006.01) |
| *H02G 3/32* | (2006.01) |

(52) U.S. Cl.
CPC ............. *B64C 1/12* (2013.01); *B64D 41/00* (2013.01); *B64C 1/406* (2013.01); *B64D 2041/002* (2013.01); *H01B 17/265* (2013.01); *H02G 3/32* (2013.01)

(58) Field of Classification Search
CPC .......... E04B 1/2403; E04B 2001/2415; E04C 2003/0473; E04C 3/065; B64C 1/406
See application file for complete search history.

(56) References Cited

U.S. PATENT DOCUMENTS

| | | | | |
|---|---|---|---|---|
| 5,823,484 A | * | 10/1998 | Barnard | .................. B64C 1/406 248/65 |
| 7,059,565 B2 | * | 6/2006 | Scown | .................... B64C 1/066 244/119 |
| 7,490,801 B2 | | 2/2009 | Plate et al. | |

* cited by examiner

*Primary Examiner* — Timothy D Collins
*Assistant Examiner* — Justin Michael Heston
(74) *Attorney, Agent, or Firm* — Avek IP, LLC (57) ABSTRACT

A quick attach bracket includes a first portion and a second portion aligned substantially perpendicular with the first portion, a retaining ridge disposed across the first portion and extending in the direction of the second portion, and a hub disposed on the second portion and extending in the direction of the first portion. The retaining ridge is configured to receive a flange of a structure. The hub includes a sidewall that extends from the second portion in the direction of the first portion, a façade aligned with the second portion, and a rounded portion connecting the sidewall and the façade to assist with installation of the hub into a recess or through-hole of the structure. The quick attach bracket is installable by hand via hooking of the retaining ridge on the flange and insertion of the hub into the recess or through-hole.

17 Claims, 12 Drawing Sheets

QUICK ATTACH BRACKET

CROSS-REFERENCE TO RELATED APPLICATIONS

This application claims the benefit of U.S. Provisional Patent Application Ser. No. 62/947,420, entitled Quick Attach Bracket, and filed Dec. 12, 2019, the disclosure of which is herein incorporated by reference in its entirety.

BACKGROUND

1. Field

Embodiments of this disclosure relate generally to aircraft interior installations and more specifically to toolless mounting brackets for airframe lightening holes.

2. Description of the Related Art

Many types of brackets are known. For example, U.S. Pat. No. 7,059,565 to Scown et al. discloses a bracket that includes two bracket attach devices that are received in two corresponding mounting holes and a flange mount portion having a flange clip that clips around the edge of the flange. Each bracket attach device has a snap-fit configuration with snap elements that insert into a respective mounting hole.

U.S. Pat. No. 5,823,484 to Barnard et al. discloses a self-locating snap-in support bracket that self-locates in a structural member via a lightening hole. The bracket has two flanges for hooking onto a flange and a ridge of a support structure.

U.S. Pat. No. 7,490,801 to Plate et al. discloses a suspension clamping holder for being locked on a supporting structure. The suspension clamping holder is suspended in a facilitation bore of a crossbeam via a hook-shaped holding element and held in place in the facilitation bore by a closure element that slides on the holding element.

SUMMARY

In an embodiment, a quick attach bracket is configured to releasably secure to a structure. The quick attach bracket includes a first portion and a second portion aligned substantially perpendicular with the first portion, a retaining ridge disposed across the first portion and extending in the direction of the second portion, and a hub disposed on the second portion and extending in the direction of the first portion. The retaining ridge is configured to receive a flange of a structure. The hub includes a sidewall that extends from the second portion in the direction of the first portion, a façade aligned with the second portion, and a rounded portion connecting the sidewall with the façade to assist with installation of the hub into a recess or a through-hole of the structure.

In another embodiment, a bracket includes an L-shaped member having a lateral segment extending laterally and a longitudinal segment extending longitudinally. The lateral segment is substantially perpendicular to the longitudinal segment. A retaining ridge is provided on the lateral segment. The retaining ridge is longitudinally raised above the lateral segment, and the retaining ridge is configured to receive a flange of a beam. A hub extends from the longitudinal segment in the direction of the lateral segment. The hub has a curved outer diameter shaped to insert into a lightening hole of the beam, such that the bracket is installable by hand via hooking of the retaining ridge on the flange and insertion of the hub into the lightening hole. The hub is truncated to partially fill the lightening hole when installed on the beam such that the hub may be pulled out of the lightening hole by hand for uninstalling the bracket from the beam.

BRIEF DESCRIPTION OF THE DRAWINGS

Illustrative embodiments of the present disclosure are described in detail below with reference to the attached drawing figures, which are incorporated by reference herein and wherein.

The drawing figures do not limit the invention to the specific embodiments disclosed and described herein. The drawings are not necessarily to scale, emphasis instead being placed upon clearly illustrating the principles of the invention.

DETAILED DESCRIPTION

Brackets attached to an aircraft are typically installed with rivets, making them a permanent fixture onboard the aircraft. Lightening holes are formed in many aircraft components to lighten the aircraft's weight. For example, in an aircraft airframe, lightening holes may be spaced along each girder aligned radially around the fuselage, as well as along each strut or stringer arranged longitudinally down the length of the fuselage.

Embodiments of the present disclosure provide a quick attach bracket that hooks around a flange of a structural member, such as a stringer or girder, and inserts partially into a lightening hole located nearby the flange. The quick attach bracket is rivetless and designed to quickly and easily snap into place by hand, providing a bracket for internally mounting non-structural objects to the airframe without the need for expensive tooling, coordinated pilot holes, or hard mounting via rivets. Additionally, the quick attack bracket is designed to only partially fill a lightening hole such that the bracket may be easily grasped for removal from the structural member and to allow other items (e.g., wires, cables, hydraulic lines) to pass through and coexist in the same lightening hole.

Figure 1:
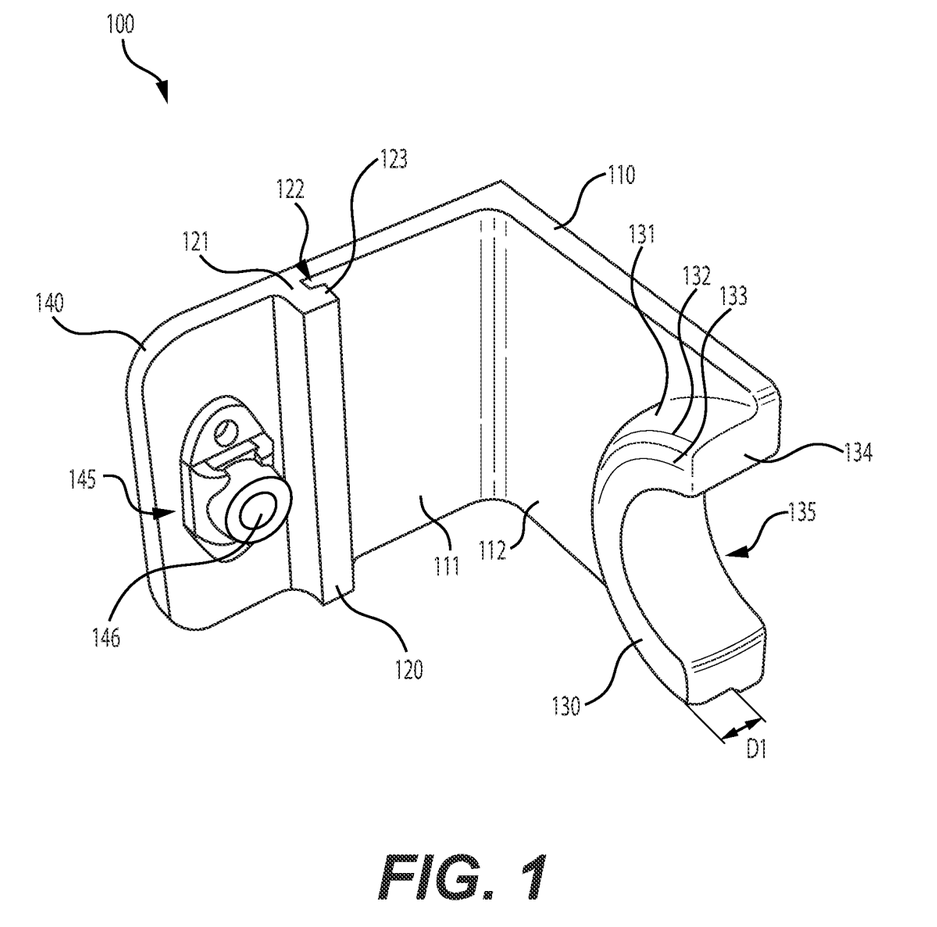
FIG. 1 provides a perspective view of a quick-attach bracket, in an embodiment.

FIG. 1 provides a perspective view of an exemplary quick-attach bracket 100. Bracket 100 includes an L-shaped member 110 having a first portion 111 arranged substantially perpendicular to a second portion 112. For example, first portion 111 is a lateral segment and second portion 112 is a longitudinal segment, with the lateral segment being substantially perpendicular to the longitudinal segment. In certain embodiments, L-shaped member 110 is formed from a single piece of material such that the first and second portions 111, 112 represent two segments of the same member aligned in different directions. In some embodiments, L-shaped member 110 is formed as a single piece of material using an additive manufacturing process (e.g., 3D printing). However, other manufacturing methods may be used to form L-shaped member 110 without departing from the scope hereof. For example, subtractive manufacturing processes (e.g., machining) may be used to form a single piece L-shaped bracket. Alternatively, bonding or welding processes may be used to mechanically couple first portion 111 to second portion 112.

First portion 111 includes a retaining ridge 120 disposed on first portion 111 substantially across a width of first portion 111 and raised above first portion 111 in the direction of second portion 112. Retaining ridge 120 includes a base 121 that extends from first portion 111 substantially in the direction of second portion 112. A retaining-ridge flange 123 extends substantially perpendicular to base 121 (e.g., substantially parallel with first portion 111). A groove 122 forms a gap between first portion 111 and flange 123. Groove 122 is adjacent base 121 and faces second portion 112. Groove 122 is adapted to receive a flange of another part or component for mounting thereto, as further described below in connection with FIG. 3.

Figure 3:
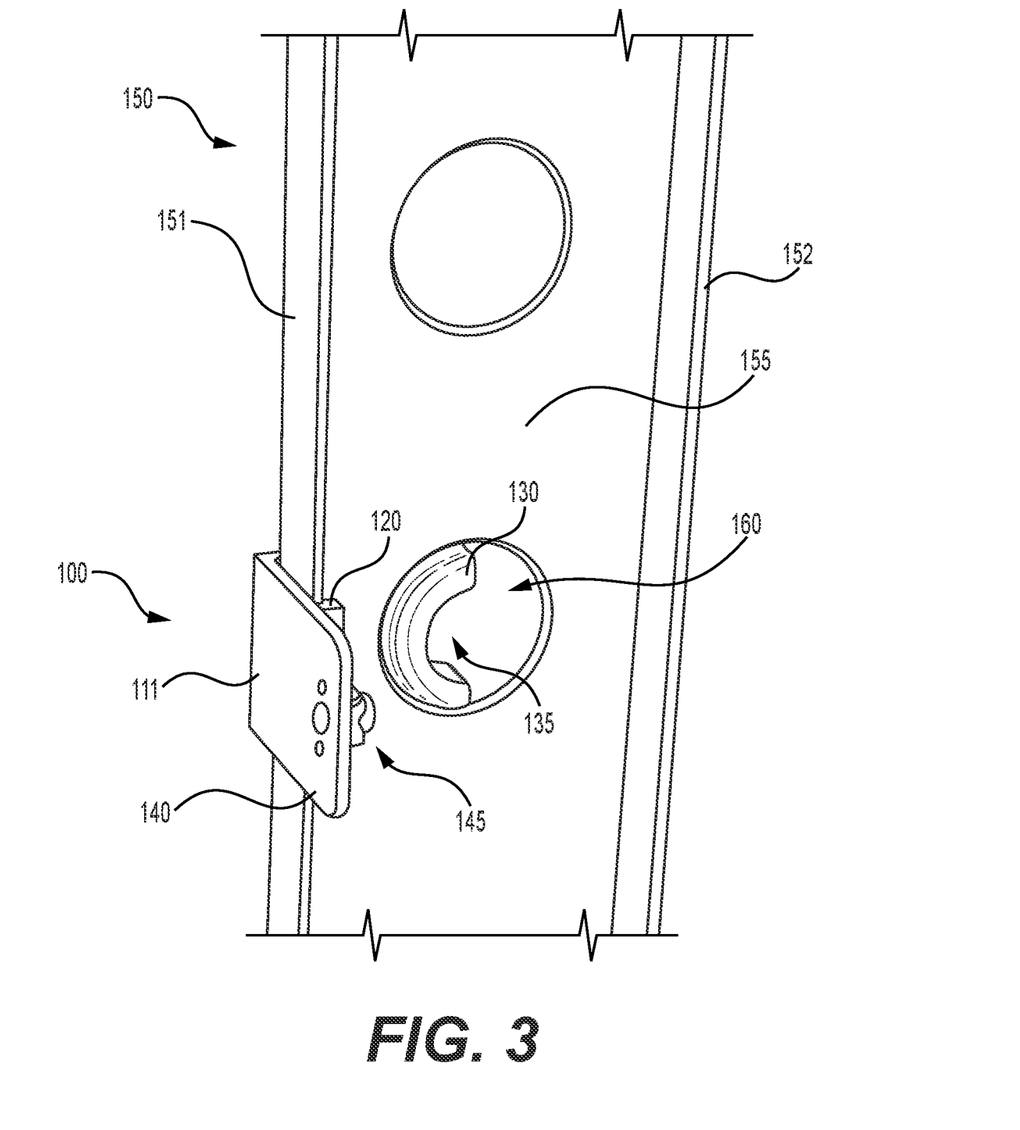
FIG. 3 provides a perspective view of the quick-attach bracket of FIG. 1 installed on a beam.

A self-centering hub 130 is disposed on second portion 112. Hub 130 extends from second portion substantially in the direction of first portion 111. Self-centering hub 130 is configured to insert into an opening, recess, or hole of another part for mounting thereto. For example, hub 130 may insert into a lightening hole of an aircraft structural member. Hub 130 has a curved outer diameter and includes a sidewall 131, a façade 133 having a flat surface aligned to be, in embodiments, substantially or exactly parallel with second portion 112, and a rounded portion 132 that provides a smooth transition between sidewall 131 and façade 133. In some embodiments, sidewall 131 includes a shallow groove to improve a secure fit within a hole. Sidewall 131 extends from second portion 112 in the direction of first portion 111 and by a distance "D1", as depicted in FIG. 1. The distance D1 is adapted such that hub 130 protrudes by a preferred amount into an opening, recess, or through-hole (e.g., as depicted in FIG. 3) to provide full engagement of hub 130. For example, for a through-hole, the distance D1 is such that sidewall 131 extends beyond the thickness of beam 150 (see FIG. 3). The distance D1 may be customized for different applications and can vary depending on e.g., a thickness of the part, a depth of the opening/recess/through-hole, and a curvature of rounded portion 132 and a curvature of the lip of the opening/recess/through-hole. In some embodiments, the distance D1 is between about 0.15-inch to about 0.25-inch. In certain embodiments, the distance D1 is about 0.18-inch. However, other D1 distances may be employed without departing from the scope hereof.

The curvature of rounded portion 132 is adapted to assist with insertion of self-centering hub 130 into an opening/recess/hole of another part, as further described below in connection with FIG. 3. An end 134 of self-centering hub 130 is aligned with an end of second portion 112. An optional notch 135 may be provided in some embodiments of self-centering hub 130 (e.g., see hub 130 depicted in FIG. 1 in contrast with that of FIG. 9). Optional notch 135, which is centrally located in hub 130, may be a through-hole as depicted in FIG. 1, or a recess or indentation (not shown), configured to assist a user with removing bracket 100 from an installation, as further described below in connection with FIG. 3.

An attachment member 140 is configured as an attachment segment of bracket 100 for attaching another part or component to bracket 100. Attachment member 140 may be an extension of first portion 111 as depicted in FIGS. 1-2 and 9-12, or attachment member 140 may be an extension of second portion 112 as depicted in FIGS. 4-8. In certain embodiments, attachment member 140 includes a nut plate 145 configured for fastening a part or component thereto. Nut plate 145 is for example a military-style nut plate having a threaded stand 146 adapted to accept a bolt with matching threads (e.g., threaded bolt 149 shown in FIGS. 11 and 12). In such an arrangement, an item of interest, such as a part or component (e.g., panel 1100 shown in FIGS. 11 and 12), may be fastened with a bolt to bracket 100 via nut plate 145, as further described below in connection with FIGS. 11 and 12. Nut plate 145 is an optional and separate component from bracket 100 and may be secured to bracket 100 by conventional means (e.g., with rivets).

Figure 2:
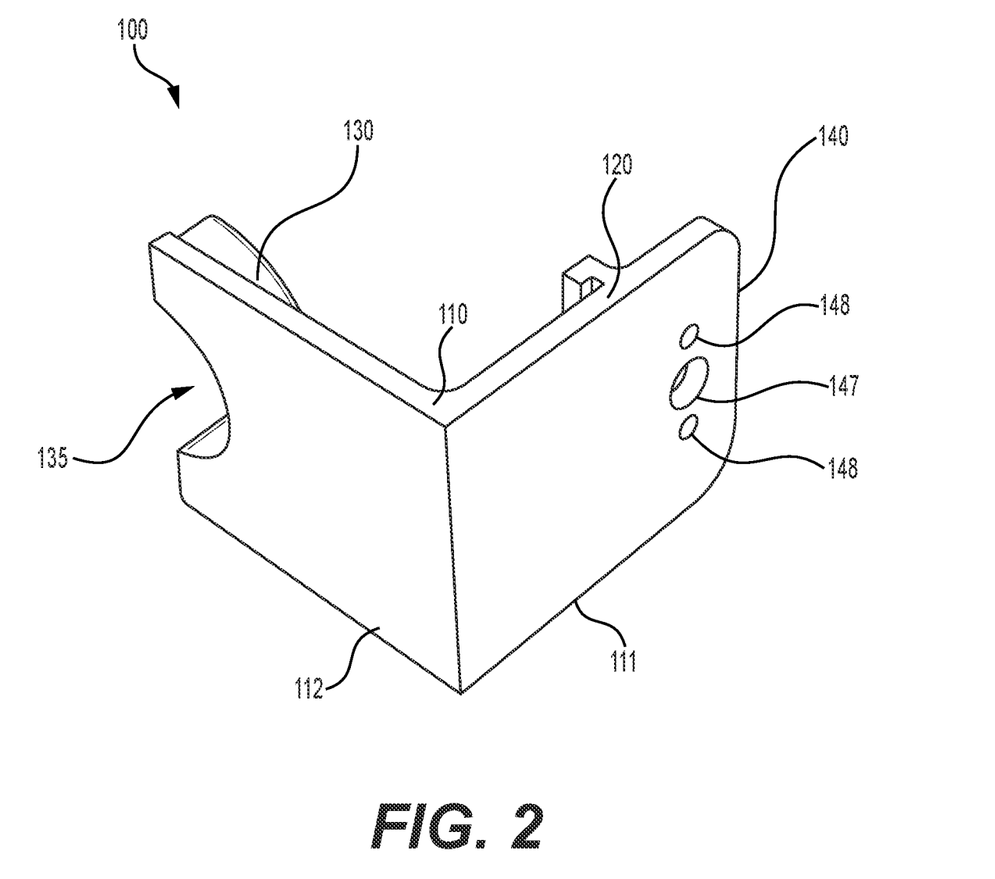
FIG. 2 provides another perspective view of the quick-attach bracket of FIG. 1.

FIG. 2 is another perspective view of quick-attach bracket 100 of FIG. 1 revealing an outer side of first portion 111 and second portion 112. A hole 147 in attachment member 140 is configured to receive a bolt via nut plate 145. A pair of holes 148 are configured to receive a securing mechanism (e.g., rivets) for securing nut plate 145 to attachment member 140.

FIG. 3 provides a perspective view of quick-attach bracket 100 of FIG. 1 installed on a beam 150. Beam 150 includes a main structural member 155 and a flange 151 that extends laterally (e.g., substantially perpendicular to main structural member 155). Beam 150, in some embodiments, is a girder of an aircraft airframe.

Bracket 100 is configured to releasably secure onto flange 151. Specifically, flange 151 fits snuggly between second portion 112 and retaining ridge 120 such that retaining ridge 120 is configured to retain flange 151. Groove 122 of retaining ridge 120 is adapted to receive an edge of flange 151.

In some embodiments, a second flange 152 is located on an opposite end of structural member 155, as depicted in FIG. 3. First and second flanges 151, 152 may both extend toward one side of beam 150 forming a C-shaped cross section; or the flanges 151, 152 may each extend in opposite directions forming a Z-shaped cross section; alternatively, the flanges 151, 152 each extend in both directions forming an I-shaped cross section. First portion 111 and retaining ridge 120 may be configured to snap on a particular flange of any size. In some embodiments, bracket 100 may be configured to snap onto second flange 152. When second flange 152 is exposed (as opposed to being secured to the aircraft skin, for example), bracket 100 may be oppositely reoriented (e.g., flipped 180°) and snapped onto second flange 152 instead of first flange 151.

Structural member 155 includes a hole 160. Self-centering hub 130 is adapted to insert into hole 160 and may include a shallow groove along sidewall 131 (see e.g., FIG. 1) for securing hub 130 to hole 160. In certain embodiments, hole 160 is a lightening hole, common to many aircraft parts, which is formed in member 155 to lighten the weight of the beam 150. Beam 150 may include a plurality of holes 160, which are not all enumerated in the Figures for clarity of illustration. Since bracket 100 is adapted to slide along flange 151 via retaining ridge 120, the location of bracket 100 along beam 150 is determined via insertion of self-centering hub 130 into one of the plurality of holes 160. In some embodiments, beam 150 is a frame of an aircraft fuselage containing a large number of lightening holes 160, thereby providing a large number of locations for installation of bracket 100. A distance that hub 130 inserts into hole 160 (e.g., see distance "D1" in FIG. 1) is adapted to enable facile installation of bracket 100 while at the same time providing a secure installation of bracket 100 to beam 150.

For installation, bracket 100 is snapped by hand onto flange 151 with self-centering hub 130 inserted into hole 160 such that bracket 100 is releasably secured to beam 150. The shape of hub 130 is configured for hub 130 to center itself within hole 160, and the curvature of rounded portion 132 is adapted to assist with insertion of hub 130 into hole 160. In some embodiments, a radius-of-curvature of rounded portion 132 is between about 0.03-inch and about 0.27-inch. In certain embodiments, the radius-of-curvature of rounded portion 132 is about 0.09-inch.

As depicted in FIGS. 1-12, hub 130 may have a circular outer diameter for matching a circular hole 160. However, other shapes of hub 130 may be formed to match various shapes of hole 160 without departing from the scope hereof. The retaining ridge 120 and hub 130 together serve as a clamp to retain bracket 100 on beam 150. For de-installation of bracket 100 from beam 150, the user may grab bracket 100 via hub 130 by hand (e.g., with a tip of a finger) and pull to dislodge hub 130 from hole 160. Self-centering hub 130 is truncated so as to only partially occupy hole 160 when installed, such that a portion of hole 160 remains open. In certain embodiments, hub 130 is a half-circle shaped protrusion configured for insertion into a circular recess or a circular through-hole of the structure, such as hole 160 of beam 150. By only partially filling hole 160 (see e.g., FIGS. 3 and 10), end 134 of second portion 112 (see FIGS. 1 and 9) is exposed for accessibility, enabling a user to easily remove bracket 100 from beam 150. Also by only partially filling hole 160, an item such as a cable, wire, or fluid line may be routed through hole 160 while bracket 100 is installed. Additionally, a smaller hub 130 reduces the weight of bracket 100. In some embodiments, hub 130 is a portion of a circle that is less than a half-circle (not shown), which provides a larger opening through hole 160 when the bracket is installed and further reduces the weight of the bracket.

Optional notch 135 may be sized with an inner diameter configured for receiving a user's finger such that the user may more easily grab hub 130 with a tip of a finger inserted into notch 135. In certain embodiments, the inner diameter of optional notch 135 is about 0.75-inch. In some embodiments, notch 135 is configured for enabling one or more items to pass through hole 160 (not shown) such that bracket 100 may be installed in the same lightening hole as the items. For example, one or more of a wire, a cable, or a hydraulic fluid line may be routed through the hole 160 via notch 135.

In an exemplary use of bracket 100, beam 150 is a girder of an aircraft fuselage frame with flange 152 attached to the aircraft skin. This enables bracket 100 to be used for attaching a variety of objects to the frame. Examples include but are not limited to wiring harnesses, wire bundles, individual wires, ducting, tubing, fluid loops, interior panels, lighting fixtures, etc. However, bracket 100 may be installed on any beam 150 having a flange 151 and hole 160 and used to attach any object without departing from the scope hereof.

In the embodiment depicted in FIGS. 1-3, attachment member 140 is simply an extension of first portion 111 that extends beyond retaining ridge 120. However, in alternative embodiments, attachment member 140 may extend from second portion 112 instead of first portion 111 (see e.g., FIGS. 4 and 6). Additionally, attachment member 140 may include a lateral extension, such as an L-shaped extension (see e.g., FIG. 4) or a T-shaped extension (see e.g., FIG. 6), which provides an offset from beam 150 but retains the orientation of nut plate 145 shown in FIG. 3. Alternatively, attachment member 140 may extend from second portion 112 (e.g., as in FIGS. 4 and 6) without a lateral extension such that nut plate 145 is oriented to face laterally (not shown). In other embodiments, attachment member 140 extends from first portion 111 (as in FIG. 3) while also including L-shaped and T-shaped extensions (not shown). In addition to these exemplary embodiments, many alternative variations to the bracket attachment member may be formed to accommodate specific uses without departing from the scope hereof.

Figure 4:
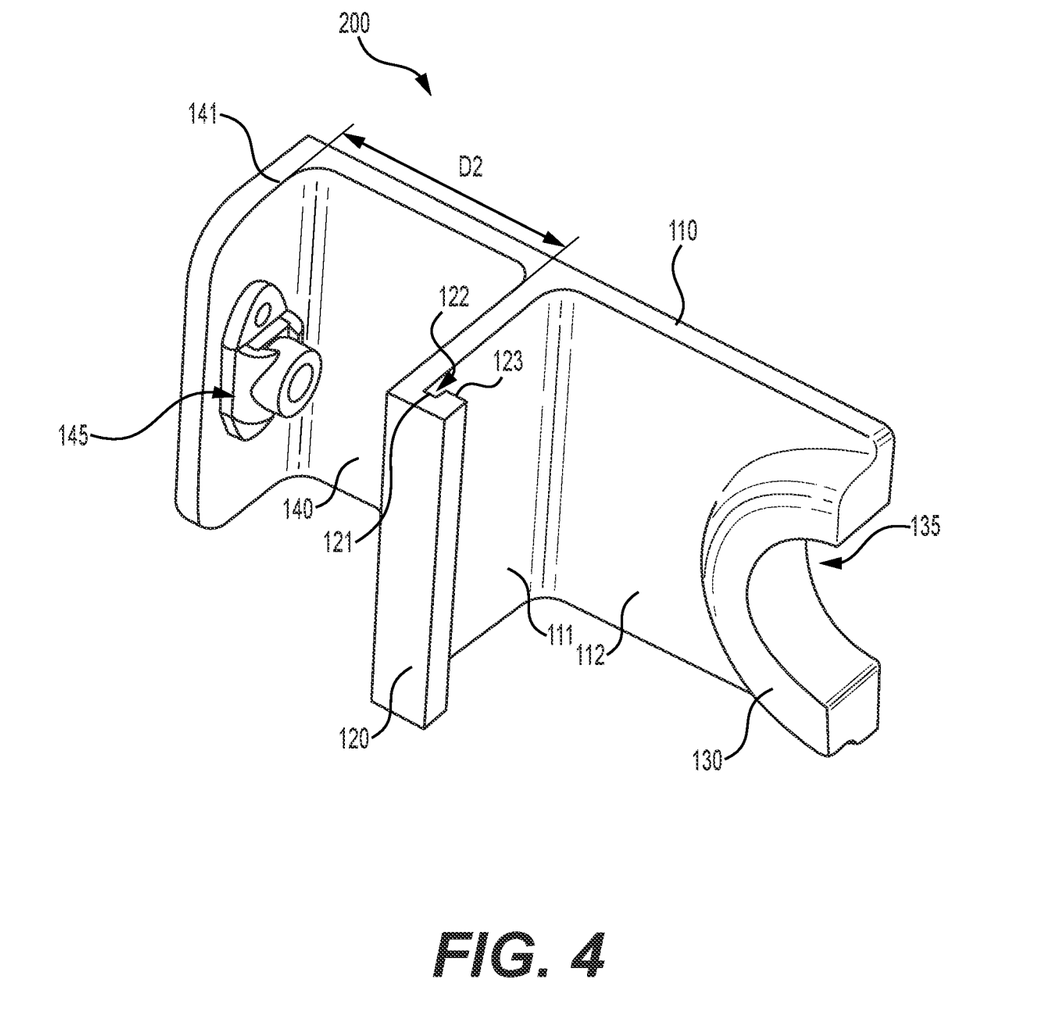
FIG. 4 provides a perspective view of another embodiment of a quick-attach bracket.

FIG. 4 provides a perspective view of an exemplary quick-attach bracket 200. Bracket 200 includes many of the same features as bracket 100 and their description may not be repeated accordingly. Likewise, not all features in FIG. 4 are enumerated for clarity of illustration. In bracket 200 of FIG. 4, attachment member 140 is configured as an extension of second portion 112 in contrast to bracket 100 of FIG. 1 in which attachment member 140 extends from first portion 111. In other words, attachment member 140 of bracket 200 extends from the corner of L-shaped member 110 (e.g., where first portion 111 and second portion 112 meet), as opposed to extending from the end of first portion 111 as with bracket 100.

Attachment member 140 of bracket 200 includes an approximately ninety-degree bend forming an L-shape, such that attachment member 140 provides a laterally extending portion 141 aligned substantially in parallel with first portion 111. Laterally extending portion 141 aligns nut plate 145 towards hub 130, which is the same alignment as the nut plate 145 on bracket 100 of FIG. 1, resulting in the same alignment with respect to beam 150 when installed (e.g., compare the orientation of nut plate 145 with respect to beam 150 between FIG. 3 and FIG. 5). As depicted in FIG. 4, a distance "D2" represents a length of attachment member 140 that extends beyond first portion 111. Bracket 200 provides an offset between first portion 111 and laterally extending portion 141 equivalent to the distance D2. The distance D2 may be varied based on the panel or part to be mounted via bracket 200. In some embodiments, the distance D2 is between about 0.5-inch to about 1.5-inch. However, other D2 distances may be used without departing from the scope hereof. As with bracket 100 of FIG. 1, bracket 200 may be formed via additive manufacturing methods or otherwise such that the bracket 200 is formed of a single piece of material (not including nut plate 145).

Figure 5:
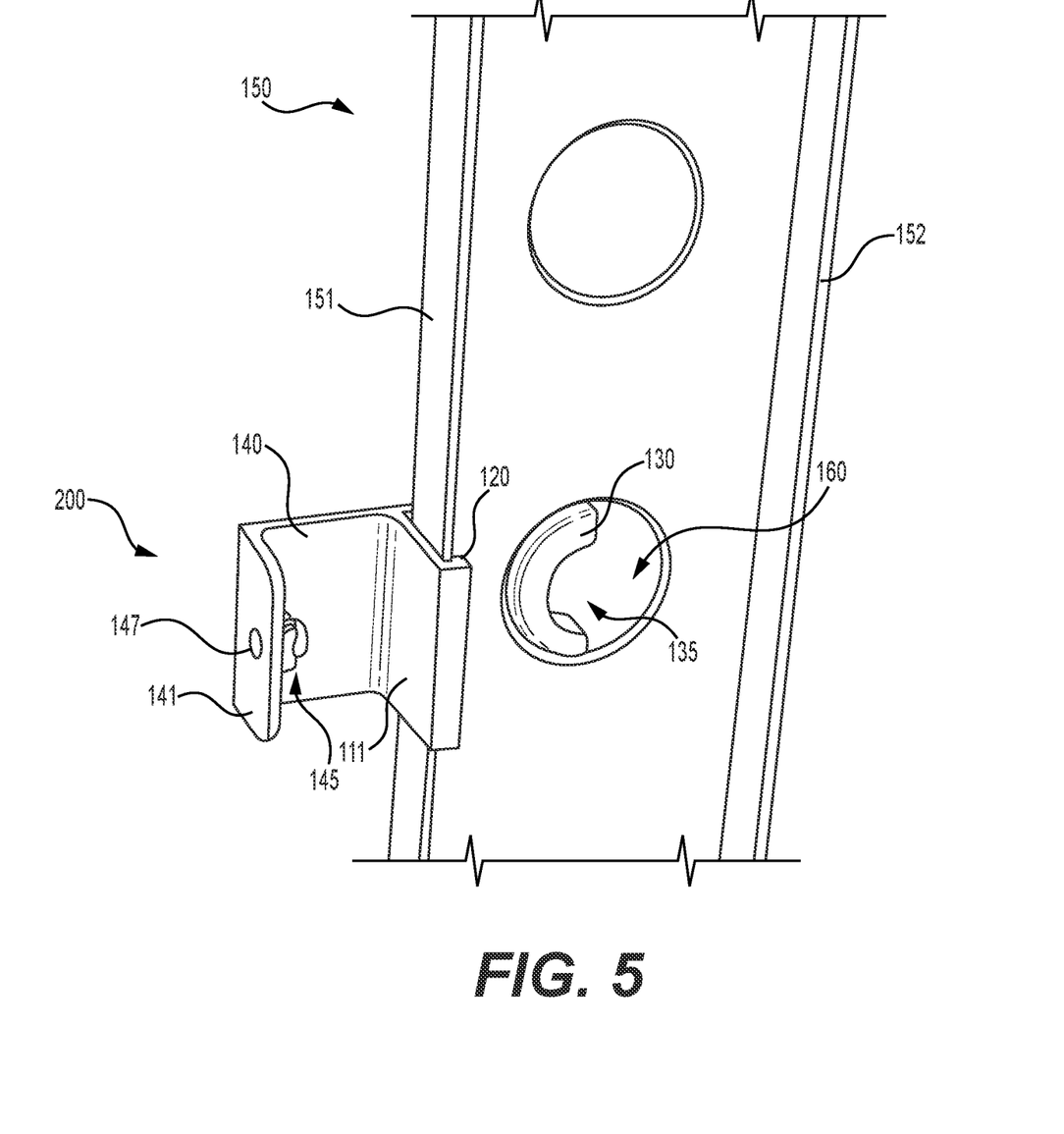
FIG. 5 provides a perspective view of the quick-attach bracket of FIG. 4 installed on a beam.

FIG. 5 provides a perspective view of quick-attach bracket 200 of FIG. 4 installed on beam 150. Features that are the same or similar are enumerated with like numerals and their description may not be repeated accordingly. Bracket 200 provides an alternative configuration for fastening parts or components to beam 150. Attachment member 140 of bracket 200 includes a laterally extending member that provides an offset for attaching an object away from beam 150 as compared to bracket 100 in FIG. 3 in which an object attaches directly adjacent beam 150. The distance D2 depicted in FIG. 4 determines the size of the offset from beam 150. The length D2 of attachment member 140 may be longer or shorter than what is depicted in FIG. 5 without departing from the scope hereof.

Figure 6:
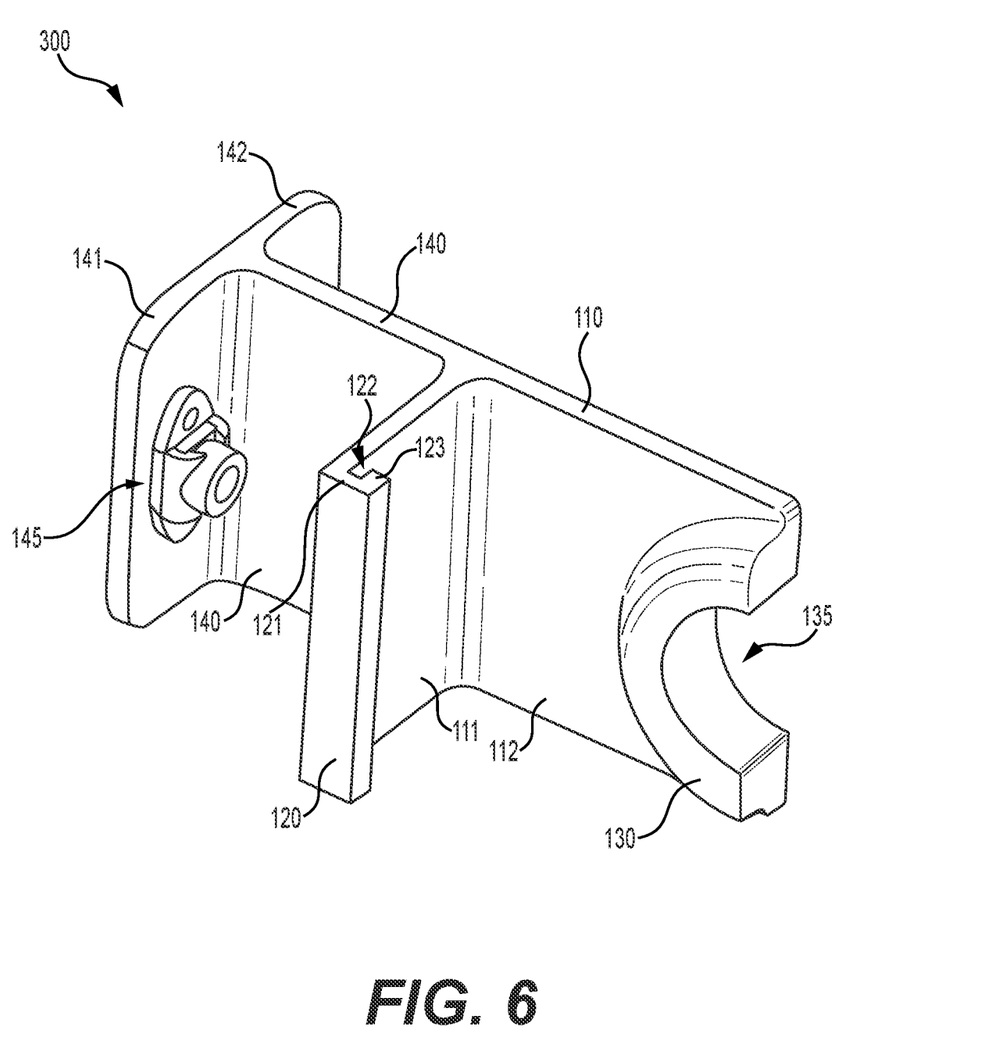
FIG. 6 provides a perspective view of yet another embodiment of a quick-attach bracket.

FIG. 6 provides a perspective view of an exemplary quick-attach bracket 300. Bracket 300 is an example of bracket 200 with a T-shaped variation of attachment member 140. Specifically, attachment member 140 includes a first lateral portion 141, and a second lateral portion 142 that extends opposite from the first lateral portion 141. First lateral portion 141 and second lateral portion 142 are aligned substantially parallel with first portion 111, and first and second lateral portions 141, 142 extend laterally from both sides of second portion 112. The second lateral portion 142 may include a second attachment mechanism such as a second nut plate 145 for securing parts or components thereto (see FIGS. 7 and 8).

Figure 7:
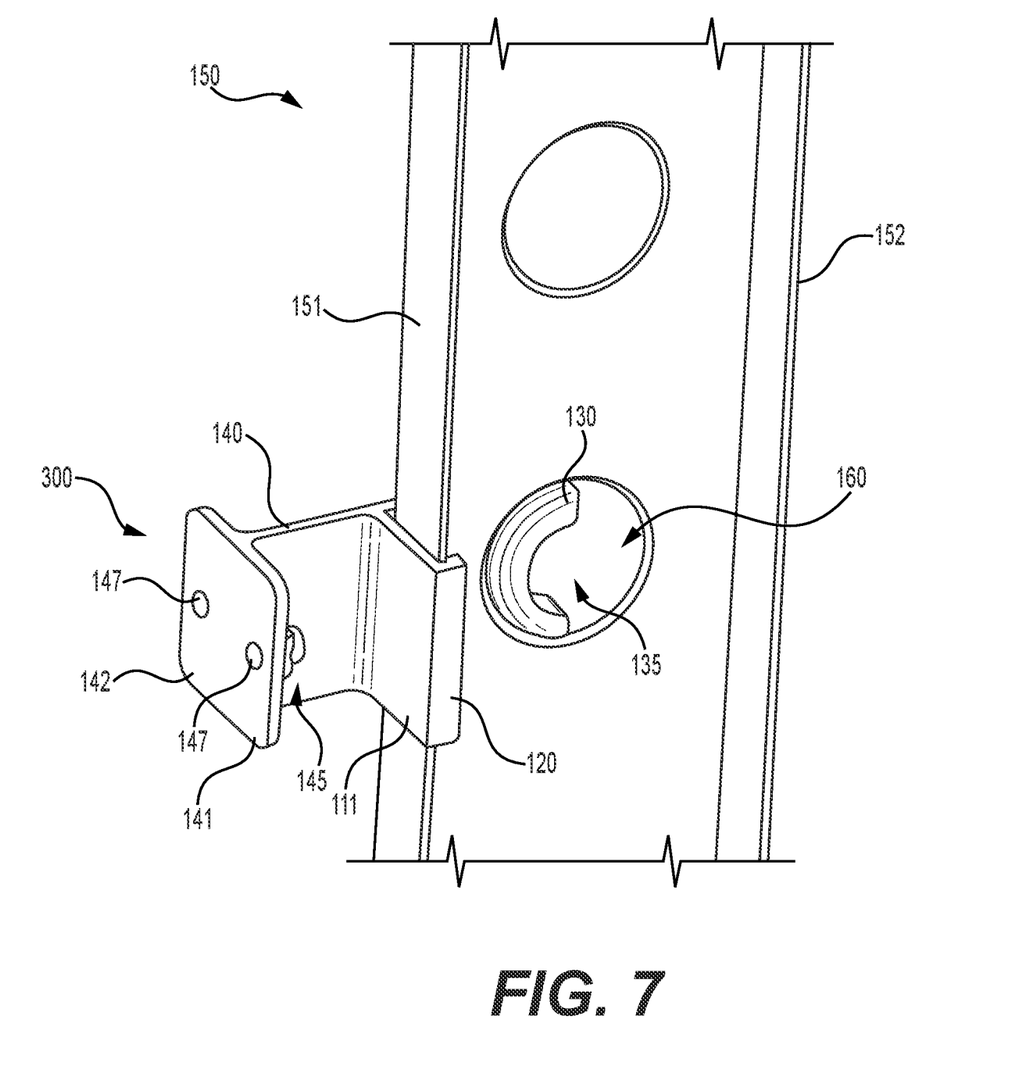
FIG. 7 provides a perspective view of the quick-attach bracket of FIG. 6 installed on a beam.
Figure 8:
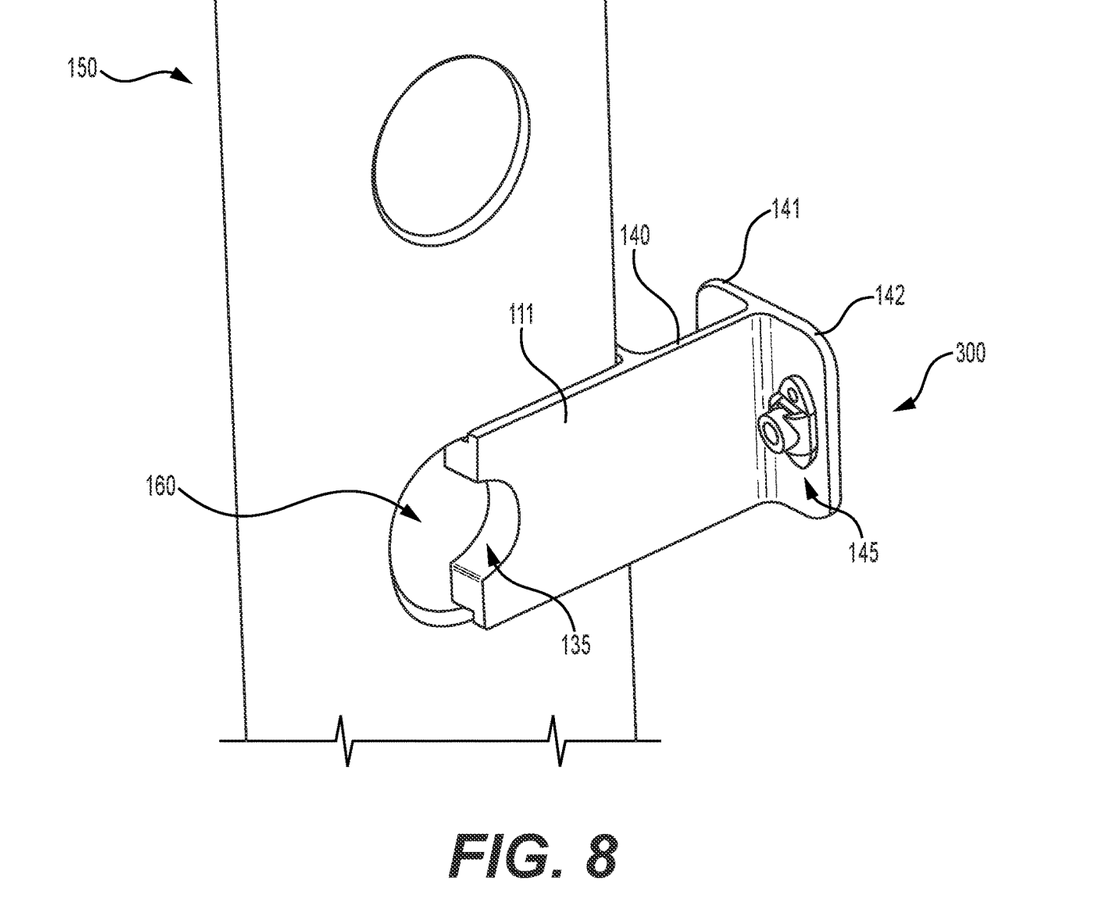
FIG. 8 provides another perspective view of the quick-attach bracket of FIG. 6 installed on a beam.

FIGS. 7 and 8 provide perspective views of quick-attach bracket 300 of FIG. 6 installed on beam 150. FIGS. 7 and 8 are best viewed together with the following description. Bracket 300 includes two attachment locations via holes 147, which allows fastening of two parts or a double fastening of one part (e.g., to provide a more secure fastening means) via a pair of nut plates 145 or other fastening mechanisms. For example, adjacent edges of two interior panels may be mounted via bracket 300 such that a seam between the two panels is aligned with attachment member 140. In an embodiment, second portion 142 may be aligned with second portion 112 (not shown) instead of being aligned with first lateral portion 141, such that attachment member 140 is no longer T-shaped but still provides two locations for attachment mechanisms.

Figure 9:
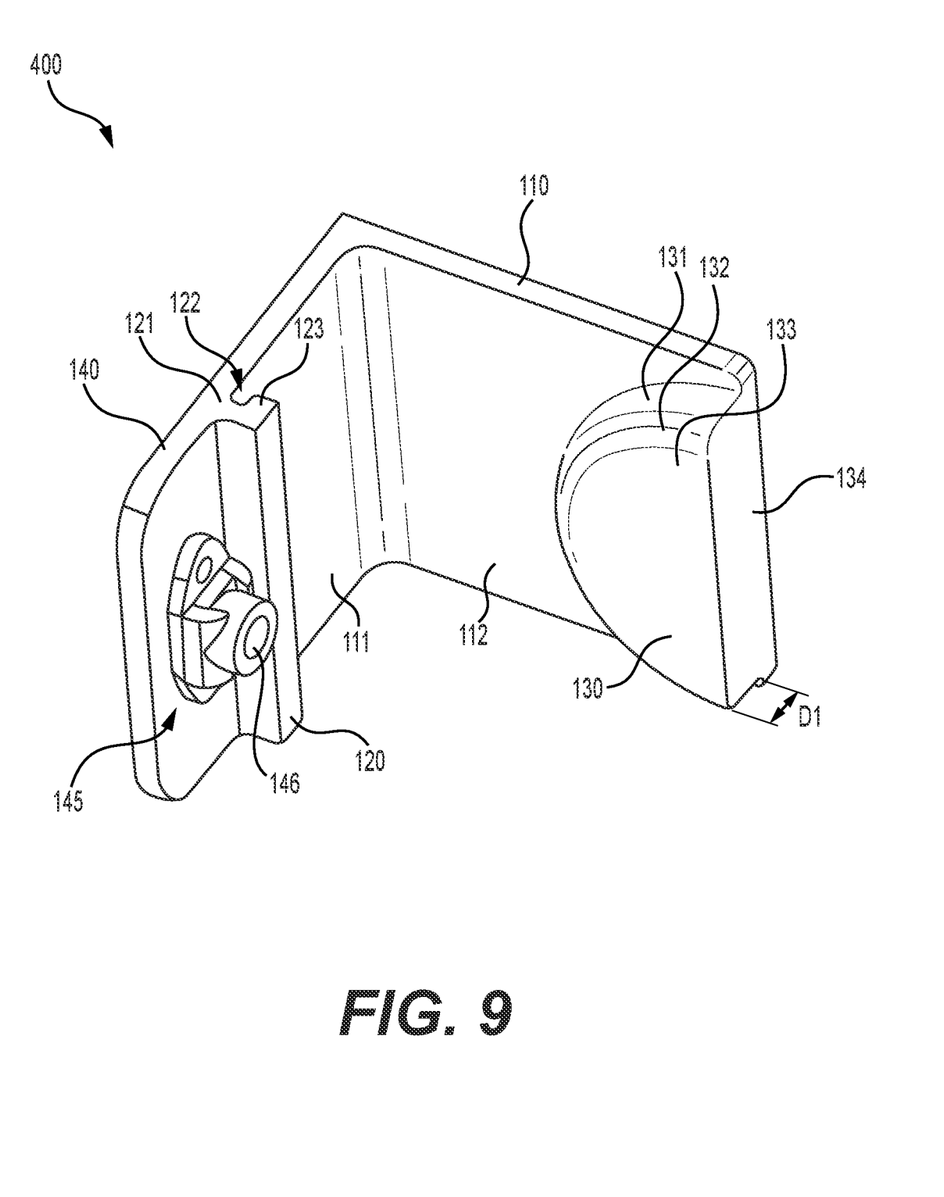
FIG. 9 provides a perspective view of still another embodiment of a quick-attach bracket.

FIG. 9 provides a perspective view of an exemplary quick-attach bracket 400. Bracket 400 is an example of bracket 100 without optional notch 135. Without notch 135, a user may still fit a tip of their finger into the unoccupied portion of hole 160 (see FIG. 10), enabling the user to grab hub 130 via end 134 by hand for toolless retrieval of bracket 400 from beam 150.

Figure 10:
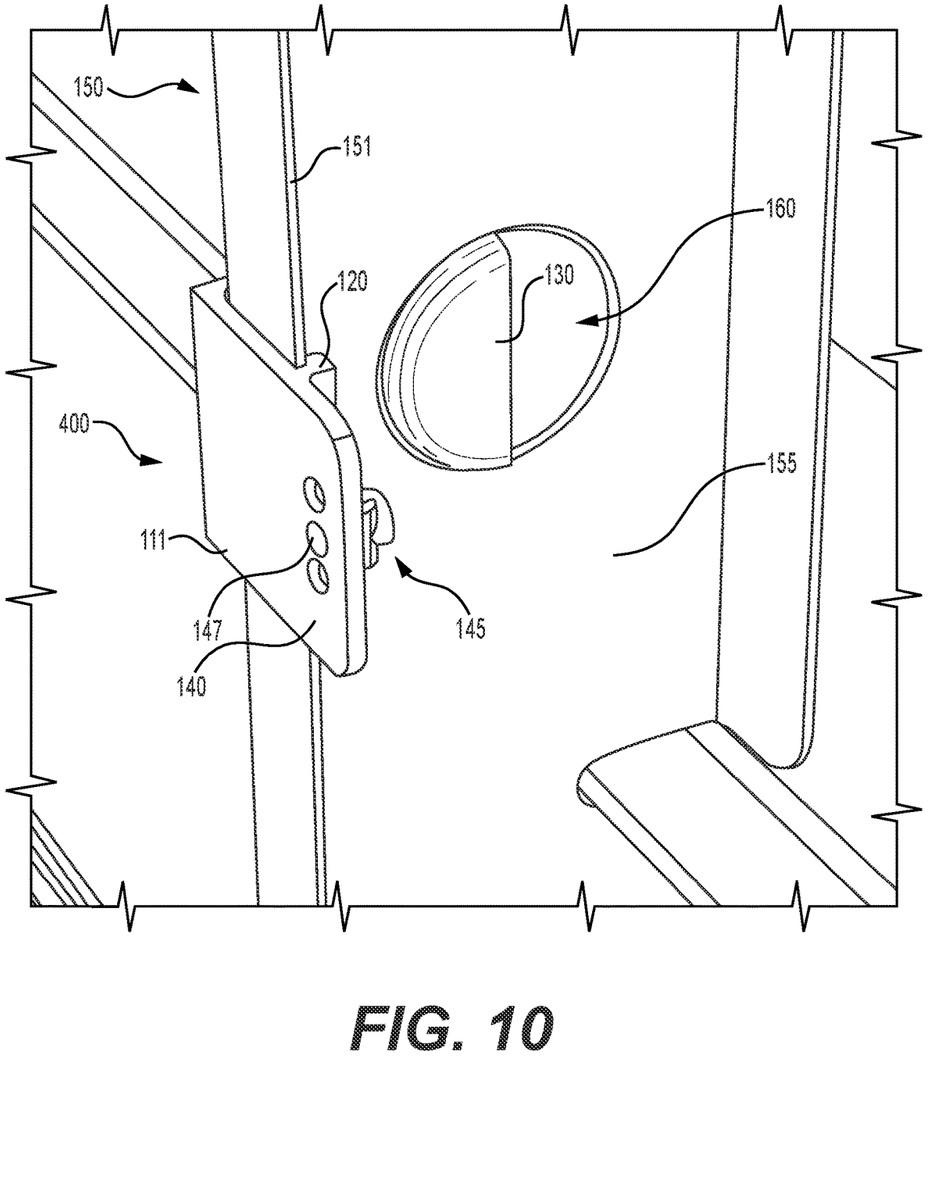
FIG. 10 provides a perspective view of the quick-attach bracket of FIG. 9 installed on a beam.

FIG. 10 provides a perspective view of quick-attach bracket 400 of FIG. 9 installed on beam 150. As depicted in FIG. 10, beam 150 may be a component of an aircraft frame such as a girder located along an interior portion of an aircraft skin.

Figure 11:
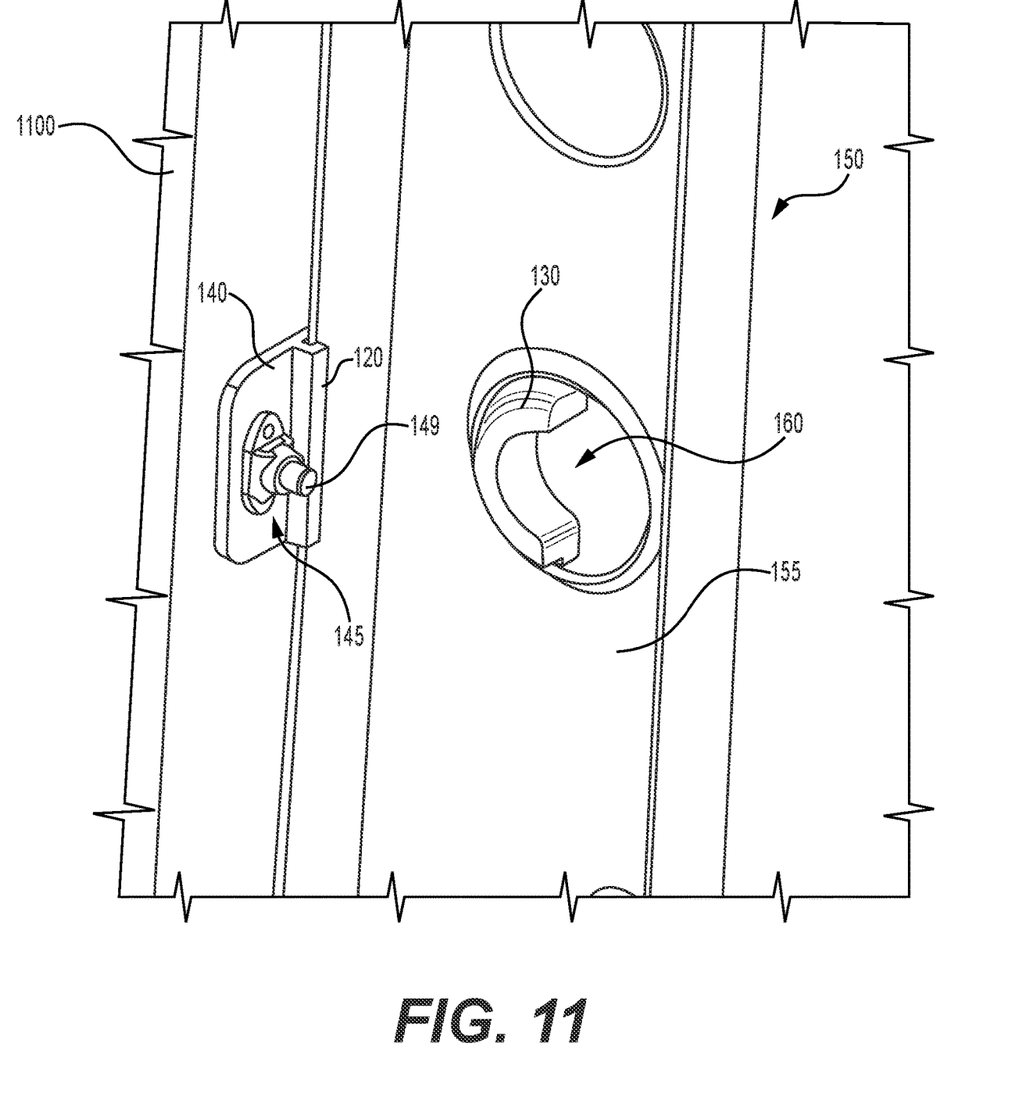
FIG. 11 provides a perspective view of the quick-attach bracket of FIG. 1 installed on a beam and having a panel attached thereto, in an embodiment.
Figure 12:
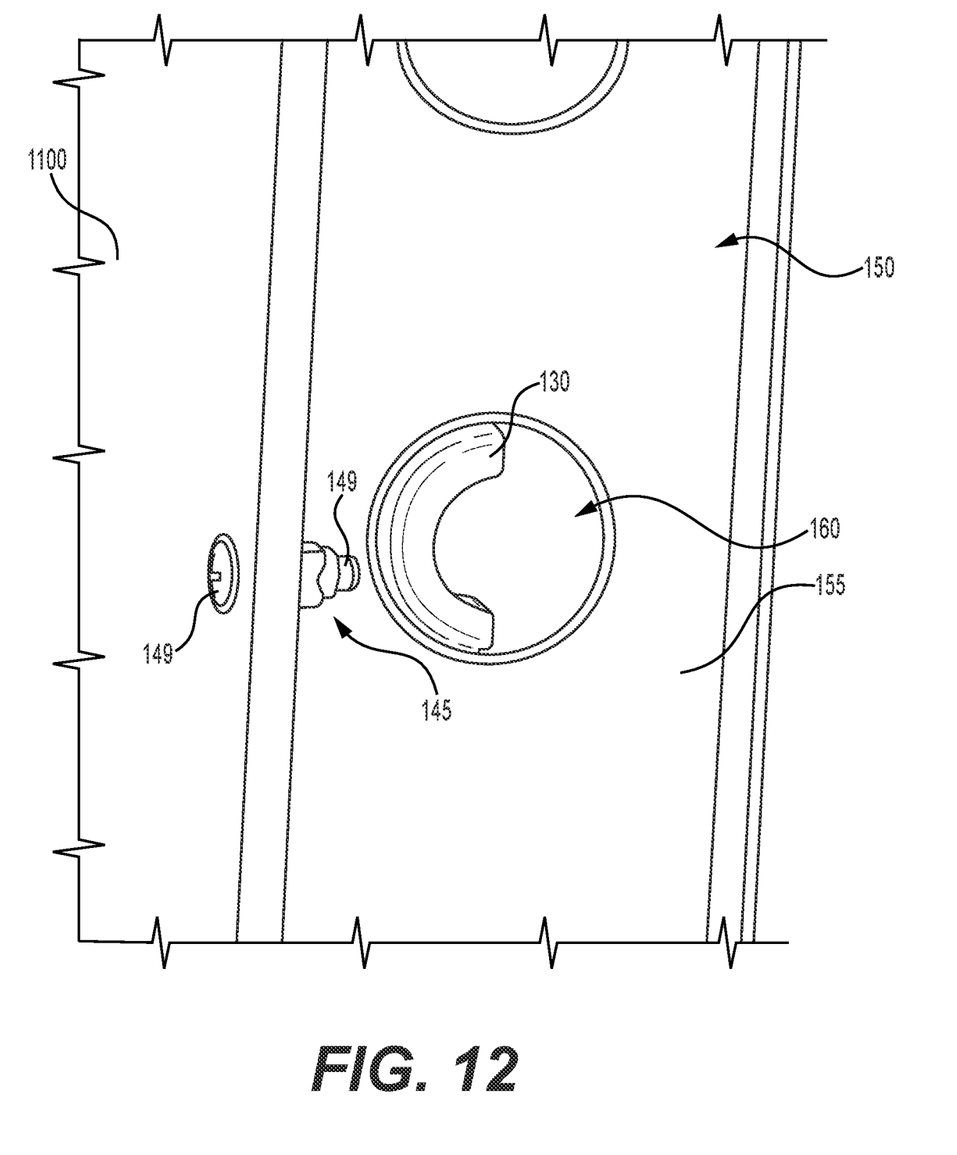
FIG. 12 provides another perspective view of the quick-attach bracket of FIG. 1 installed on a beam and having a panel attached thereto, in an embodiment.

FIGS. 11 and 12 provide perspective views of quick-attach bracket 100 of FIG. 1 installed on beam 150 and having a panel 1100 attached thereto. Items enumerated with like numerals from previous figures are the same or similar and their description may not be repeated accordingly. Panel 1100 is an example of an object that may be attached to a structure via embodiments of the quick-attach bracket disclosed herein. Panel 1100 is for example an interior panel for an aircraft cabin. A threaded bolt 149, depicted in FIGS. 11 and 12, may be used to attach panel 1100 to bracket 100 via nut plate 145.

Advantages of quick-attach brackets 100, 200, 300 and 400 include that the brackets may be quickly added, moved, removed, or replaced without the need for tools or rivets. For example, if a failure of nut plate 145 occurs, the entire bracket may be quickly replaced rather than needing to drill out the rivets of the nut plate.

A variety of materials may be used to form quick-attach brackets 100, 200, 300 and 400. The characteristics of the brackets, including a material type, a thickness, and a width of the brackets, are used to predetermine their overall stiffness and flexibility. These properties are configured to provide sufficient flexibility of the bracket to enable easy installation, while simultaneously providing sufficient stiffness to securely attach the bracket to a beam. Exemplary materials include plastics and metals.

In some embodiments, the self-centering hub 130 is formed of a different material than L-shaped member 110. For example, the quick-attach bracket may be formed using a 3D printing process that allows for more than one material to be incorporated into the printed part. Alternatively, hub 130 is a separate component that is fixed (e.g., bonded) to L-shaped member 110. Forming hub 130 from a softer and sufficiently malleable material compared to L-shaped member 110 may be used to accommodate tolerance variation between different holes 160. For example, hole 160 may be sized and/or located without a tight tolerance so that a plurality of holes 160 may have slightly varying inner diameters and/or slightly varying distances from flange 151. A more malleable material used for hub 130 may absorb these slight tolerance variations as hub 130 inserts into hole 160. The more malleable material also forms a more complete and secure coupling with hole 160 when installed. Exemplary 3D printing materials used for the embodiments disclosed herein include, but are not limited to, nylon, acrylonitrile butadiene styrene (ABS), polycarbonate, epoxy resin, and thermoplastic such as ULTEM™ 1010 (Stratasys Ltd.).

In other embodiments (not shown), self-centering hub 130 is a separate component that is slidably mounted to L-shaped member 110. For example, L-shaped member 110 may include a sliding feature such that the position of hub 130 is adjustable. A set screw or other mechanism may be used to secure hub 130 to L-shaped member 110 once a desired position is attained. This embodiment has the advantage of being capable of accommodating larger variations with the location of hole 160 while still being relatively easy to install/uninstall. The sliding feature also enables one type of bracket to be used with different sized beams 150. However, a tool may be required, which is less preferable compared to toolless installation/removal of brackets 100, 200, 300 and 400.

Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure.

It will be understood that certain features and subcombinations are of utility and may be employed without reference to other features and subcombinations and are contemplated within the scope of the claims.

The invention claimed is:

1. A quick attach bracket configured to releasably secure to a structure, comprising:
   a L-shaped bracket having a first portion and a second portion aligned substantially perpendicular with the first portion, wherein the first portion has a first exposed end and the second portion has a second exposed end;
   a retaining ridge disposed across the first portion and extending in a direction of the second portion, wherein the retaining ridge is configured to receive a flange of a structure; and
   a semi-circular notch formed through the second exposed end; and a hub comprising a semi-circular protrusion surrounding the semi-circular notch at the second exposed end of the second portion, the semi-circular protrusion comprising:
- a sidewall that extends from the second portion in the direction of first portion;
- a façade aligned with the second portion; and
- a rounded portion connecting the sidewall with the façade to assist with installation of the hub into a circular recess or a circular through-hole of the structure, such that the semi-circular protrusion partially occupies a portion of the circular recess or the circular through-hole when installed.

2. The quick attach bracket of claim 1, wherein the retaining ridge is adapted to slide along a flange of a structure such that a location of the quick attach bracket along the structure is determined via insertion of the hub into the circular recess or the circular through-hole of the structure.

3. The quick attach bracket of claim 1, wherein the sidewall extends from the second portion by a first distance, the first distance being configured such that the hub protrudes by a preferred amount into the recess or the through-hole of the structure.

4. The quick attach bracket of claim 1, further comprising a predetermined stiffness, the predetermined stiffness being determined by characteristics of the first portion and the second portion, the characteristics comprising: a) a material type, b) a thickness, and c) a width, such that the quick attach bracket is sufficiently flexible to enable easy installation while simultaneously being sufficiently stiff to securely attach the quick attach bracket to the structure.

5. The quick attach bracket of claim 1, wherein the hub is formed of a softer material compared with the first portion and the second portion, the hub being fixed to the second portion such that the quick attach bracket is sufficiently stiff to securely attach to the structure, while the hub is sufficiently malleable to accommodate tolerance variations of a recess or a through-hole of the structure.

6. The quick attach bracket of claim 1, further comprising an attachment member mechanically coupled to either the first portion or the second portion, wherein the attachment member is configured for attaching an object to the quick attach bracket.

7. The quick attach bracket of claim 6, wherein the attachment member comprises an attachment mechanism configured for fastening a part or component to the quick attach bracket, the attachment mechanism having a threaded stand adapted to accept a bolt with matching threads.

8. The quick attach bracket of claim 1, further comprising an attachment member configured for attaching an object to the quick attach bracket, the attachment member having an L-shaped extension that extends longitudinally from the second portion by a second distance, the L-shaped extension having a laterally extending member aligned substantially parallel with the first portion and extending in the direction of the first portion.

9. The quick attach bracket of claim 8, wherein the attachment member provides an offset from the structure for attaching an object away from the structure by the second distance.

10. The quick attach bracket of claim 1, further comprising an attachment member configured for attaching an object to the quick attach bracket, the attachment member having a T-shaped extension that extends longitudinally from the second portion by a second distance, the T-shaped extension having a laterally extending member aligned substantially parallel with the first portion and extending from both sides of the second portion.

11. A bracket, comprising:
- an L-shaped member having a lateral segment extending in a lateral direction and a longitudinal segment extending in a longitudinal direction, the lateral segment being substantially perpendicular to the longitudinal segment;
- a retaining ridge on the lateral segment, the retaining ridge being raised above the lateral segment in the longitudinal direction, wherein the retaining ridge is configured to receive a flange of a beam;
- a semi-circular protrusion extending from the longitudinal segment in the lateral direction, wherein the semi-circular protrusion has a rounded outer surface lacking a ridge or a recess and configured for inserting into a lightening hole of the beam, such that the bracket is installable by hand via hooking of the retaining ridge on the flange and insertion of the hub into the lightening hole; and
- the semi-circular protrusion is configured to partially fill the lightening hole when installed on the beam such that a portion of the lightening hole remains unoccupied when the hub is installed therein.

12. The bracket of claim 11, further comprising an attachment segment mechanically coupled to the lateral segment, wherein the attachment segment is configured for attaching an object to the lateral segment directly against the flange of the beam.

13. The bracket of claim 12, wherein the attachment segment is configured for attaching an interior panel of an aircraft cabin.

14. The bracket of claim 12, wherein the attachment segment comprises a longitudinal extension configured for attaching an object a predetermined distance longitudinally away from the flange of the beam.

15. The bracket of claim 11, wherein the semi-circular protrusion comprises a central notch adapted for enabling one or more of a wire, a cable, or a hydraulic fluid line to be routed through the lightening hole while the bracket is installed on the beam.

16. The bracket of claim 11, wherein the semi-circular protrusion is formed of a malleable material made from one or more of nylon, acrylonitrile butadiene styrene, polycarbonate, epoxy resin, or thermoplastic, such that the semi-circular protrusion is configured to accommodate tolerance variation of a) an inner diameter between different lightening holes, or b) a distance between the flange and different lightening holes.

17. The bracket of claim 11, wherein the semi-circular protrusion extends in the lateral direction by a first distance from the longitudinal segment, and the first distance is between about 0.15-inch to about 0.25-inch.

* * * * *